June 7, 1960     F. R. BIRDSALL     2,939,432
DIRECTIONAL CONTROL VALVE FOR AIR MOTORS HAVING CUT-OFF MEANS
Filed Jan. 6, 1958

INVENTOR
FRED R. BIRDSALL
BY
HIS ATTORNEY

United States Patent Office 2,939,432
Patented June 7, 1960

2,939,432

DIRECTIONAL CONTROL VALVE FOR AIR MOTORS HAVING CUT-OFF MEANS

Fred R. Birdsall, Sayre, Pa., assignor to Ingersoll-Rand Company, New York, N.Y., a corporation of New Jersey Filed Jan. 6, 1958, Ser. No. 707,310

5 Claims. (Cl. 121—46.5)

This invention relates to a valve unit for an air motor and more particularly to a valve unit that will control the direction of rotation of the motor and also control the shutting down of said motor by controlling the supply of air under pressure thereto.

One object of this invention is to provide a valve unit including one valve that controls the supply and the direction of flow of air under pressure to the motor, and a second valve housed in the first valve, that controls the flow of such air independently of the first said valve.

A second object of the invention is to provide a more compact control unit for an air motor.

Figure 1:
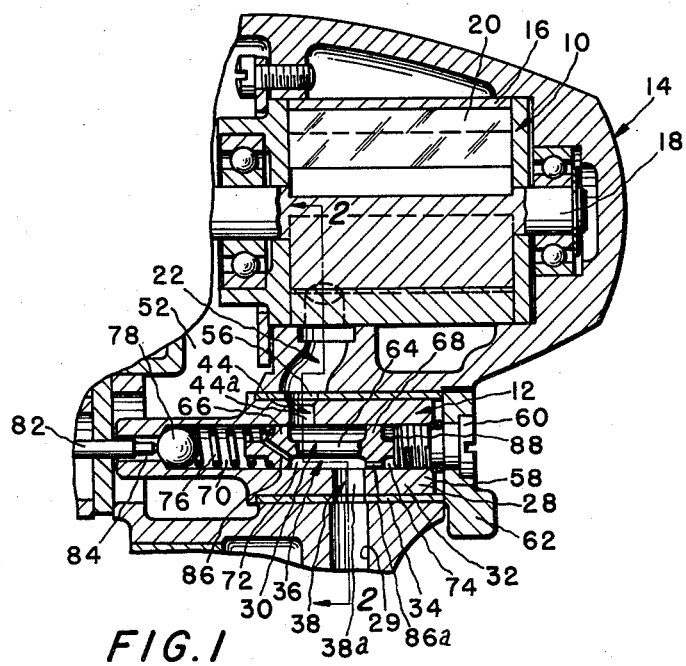
Figure 2:
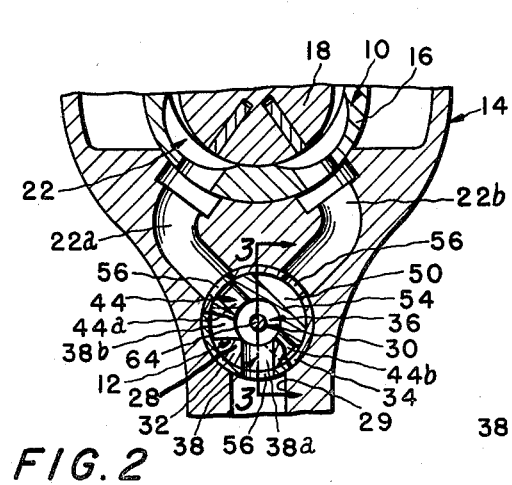
Figure 3:
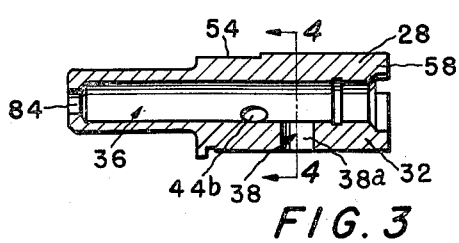
Figure 4:
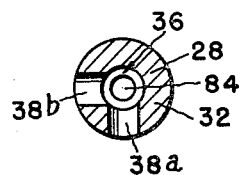

Further objects of the invention will become apparent from the following specification and drawings in which Figure 1 is a side elevation of the invention in combination with an air motor and a casing, shown in part, Fig. 2 is transverse view of Fig. 1 taken along the line 2—2 looking in the direction of the arrows, Fig. 3 is a sectional view of Fig. 2 taken along the line 3—3 looking in the direction of the arrows, and Fig. 4 is a sectional view of Fig. 3 taken along the line 4—4 looking in the direction of the arrows.

Referring to the drawings and first to Fig. 1 and air motor 10 for driving a mechanism (not shown) and a valve unit 12 for controlling the operation of said air motor 10 are both mounted in a casing 14.

The air motor 10 is of the conventional type having a casing 16, a rotor 18 eccentrically mounted therein, vanes 20 slidably mounted in the rotor, and a motor passageway 22 for conveying fluid around the periphery of the rotor 18—where such fluid acts against the sliding vanes 20 to rotate the rotor 18. The air is then exhausted from the passageway 22 to atmosphere. In this instance the motor passageway 22 has both its ends 22a and 22b open to the valve unit 12 for communication with passages in the unit 12.

The direction of rotation of the air motor is determined by which end of the motor passageway 22 is supplied with air under pressure. When air is supplied to the motor passageway end 22a the motor 10 will rotate in the clockwise direction (as viewed in Fig. 2) and conversely if such air is supplied to the passageway end 22b said motor 10 will rotate in the counterclockwise direction.

In order to direct the flow of air into one or the other of these motor passageway ends 22a and 22b, the valve unit 12 has a rotatable valve 28 with passages therein adapted to cause the air from a supply passageway 29 open at one end to the unit 12 and open at the opposite end to a suitable fluid source, to flow into one or the other of these ends 22a and 22b. This valve 28 in its left position (as shown in Fig. 1) causes the air to be conveyed through the passages in said valve 28 from the supply passageway 29 to the end 22a, and in its right position causes the air to be conveyed through passages in said valve 28 from the supply passageway to the end 22b. The valve 28 is movable to an intermediate position so as to cut off the flow of air between the passages in the valve 28 and the motor passageway 22. In essence then the valve 28 controls the direction and flow of air under pressure through the motor passageway 22 and, therefore, the direction of rotation and rotation of the motor.

A second valve 30 of the valve unit 12, housed in the first said valve 28, controls the flow of air through the motor passageway 22 independently of the valve 28, thereby providing the valve unit 12 with a second means for controlling rotation of the motor.

The valve 28 includes a tubular member 32 rotatably mounted in a sleeve 34 press fitted in the casing 14. The member 32 contains a longitudinal bore 36 extending therethrough, an inlet passage 38 with two ports 38a and 38b both of which open into the bore 36 with the opposite ends thereof selectively communicable with the supply passageway 29, and outlet passage 44, longitudinally and radially displaced from the inlet passage 38, also having two ports 44a and 44b, both of which open into the bore 36 with their opposite ends positioned to be selectively communicable with the motor passageway ends 22a and 22b.

The valve 28 also includes an exhaust passageway 50 for exhausting air from the motor passageway 22 to a chamber 52 in the casing 14 from where the exhaust air leaks to atmosphere. The passageway 50 is defined by a flatted portion 54 on the periphery of the tubular member 32 and the casing 14, and can be communicated, by selective positioning of the member 32, with either of the passageway ends 22a and 22b, but only one at a time. This passageway 50 extends from just to the right of the motor passageway 22, as seen in Fig. 1 to the chamber 52.

In the sleeve 34 there are bores 56 extending therethrough which are a part of the motor, supply and exhaust passageways 22, 29 and 50, respectively. In order to rotate the tubular member 32 one end 58 thereof is threaded to receive a complementary threaded fastener 60 which fixes a handle 62 to the end 58 externally of the casing 14, thereby providing a means for rotating the member 32.

When the valve 28 is moved to its left position, as shown in Fig. 2, the flow path of supply air is as follows; from the supply passageway 29 through the inlet port 38a to the bore 36 through the outlet port 44a through the motor passageway end 22a around the rotor 18 and exhaust from the passageway end 22b to the exhaust passageway 50 through the chamber 52 to atmosphere.

When the valve 28 is in its right position the path of the supply air is as follows; from the supply passageway 29 through the inlet port 38b to the bore 36 through the outlet port 44b through the motor passageway end 22b around the rotor 18 and exhaust from the passageway 22a to the exhaust passageway 50 through the chamber 52 to atmosphere.

The valve 28 is movable to at least one other position to cut off communication between the outlet passage 44 and the motor passageway 22, thereby shutting down the motor 10 by halting the flow of air thereto.

The valve 30 is housed in the bore 36 of the tubular member 32 and can move to a position therein to cut off the flow of air between the inlet passage 38 and the outlet passage 44 of the member 32, thereby shutting down the motor 10. This valve 30 is of the spool type, including a stem 64 with two heads 66 and 68 longitudinally displaced thereon. These heads 66 and 68 are slidably mounted in the bore 36 dividing said bore 36 into three chambers 70, 72 and 74. 70 is an exhaust chamber, the purpose of which will be explained later; 72 is a feed chamber through which air for the motor 10 flows and 74 is a handle chamber into which the fastener 60 for the handle 62 extends.

In the open position (as shown in Fig. 1) of the valve 30 there is no pressure differential between the chambers 70, 72 and 74. This is accomplished by the small passage 86 in the head 66 which communicates the exhaust chamber 70 with the feed chamber 72 and the small passage 86a which interconnects the feed chamber 72 with the handle chamber 74. With the pressures in the chambers 70, 72 and 74 equal the valve 30 will be maintained in its open position by a spring 76.

This spring 76 is housed in the exhaust chamber 70 and also biases a ball 78 to close an exhaust port 84 leading from chamber 70 to the chamber 52 in the casing 14. The ball 78 is unseated to exhaust chamber 70 by the inward movement of a plunger 82 extending into said exhaust port 84.

When the plunger 82 is actuated, the fluid under pressure in the exhaust chamber 70 escapes therefrom at a much faster rate than the passage 86 can replenish it. This causes a pressure differential to exist between the exhaust chamber 70 and the handle chamber 74, whereby the fluid force acting on the surface 88 of the head 68 will overcome the force of the spring 76, urging the valve 30 to move to a position so that the valve head 68 will be located between the inlet passage 38 and the outlet passage 44 of the tubular member 32 cutting off the flow of fluid to the motor 10. This valve 30 when actuated will move to its shut down position regardless of the position of the valve 28 thereby providing another means of shutting down the motor 10.

When the ball 78 is reseated, the fluid pressures in the chambers 70, 72 and 74 are again equalized due to the replenishment of fluid to the exhaust chamber 70 by the passage 86, and the spring 76 will move the valve 30 into its open position.

Briefly reviewing the operation of the unit 12 and first the valve 28.

When the valve 28 is in its left position, as viewed in Fig. 2, the air will flow from the supply passageway 29 through the tubular member 32, via port 38a, bore 36, and port 44a, to the motor passageway end 22a. The air will then flow through the motor passageway 22—acting against the vanes 20 to rotate the rotor 18 in the clockwise direction—exhausting therefrom to exhaust passageway 50.

The rotor 18 rotates in the counter-clockwise direction when the valve 28 is moved to its right limiting position, whereby air will flow from the supply passageway 29 through the inlet port 38b, the bore 36 and the outlet port 44b to the motor passageway end 22b around the rotor 18 through motor passageway 22 and exhaust therefrom to the motor passageway end 22a and thence to the exhaust passageway 50. The valve 28 is movable to at least one other position so as to cut off communication between the outlet passage 44 and motor passageway ends 22a and 22b thereby shutting down the motor 10.

The second valve 30 of the valve 28 will, independently of the valve 28, when actuated move to a position in the bore 36 so as to cut off the flow of air to the outlet passage 44, thereby halting the motor 10.

While I have shown and described a specific form of my invention, it is to be understood that various changes and modifications may be made without departing from the spirit of the invention as set forth in the appended claims:

I claim:

1. A valve unit for an air motor having a motor passageway with its opposite ends open to the valve unit for air under pressure to drive the motor; comprising a valve adapted to control the direction of flow of such air through the motor passageway; including a tubular member having a longitudinal bore therein, an inlet passage open to said bore and adapted to convey air from a suitable source to the bore, an outlet passage open to the bore, and an exhaust passage; said tubular member being movable to one position to communicate the outlet passage with one motor passageway end and communicate the exhaust passage with the other motor passageway end, and movable to a second position to communicate the outlet passage with said other motor passageway end and communicate the exhaust passageway with the first said motor passageway end, and a second valve housed in the bore of the first said valve, being pilot operated and movable axially therein to a position to cut off the flow of air through said bore.

2. The combination claimed in claim 1 in which the tubular member is movable to a third position to cut off communication between the inlet passage and the motor passage.

3. A valve for alternately connecting both sides of an air motor to pressure and exhaust comprising a body having a valve bore, a pressure inlet passage, an exhaust passage and two motor passages; a valve member rotatable in said bore and having at least one inlet port and one motor port in communication with an axial bore for delivering air under pressure to one side of said motor and an exhaust path for connecting the second side of said motor to exhaust; a second valve axially movable in the bore of the first valve and having an annular groove for providing a flow path from the inlet port to one motor port of said first valve and adapted to halt the flow of air under pressure to said motor and having at least one land and a restricted orifice therethrough; a valve seat in the bore of said rotatable valve and a valve member engaging said seat; means for unseating said last valve to connect said bore to exhaust and permit flow of air from said annular groove through the restricted orifice to shift said axially movable valve to a cut-off position.

4. A valve as claimed in claim 3 in which said axially movable valve is biased toward its open position and said last valve is biased toward its seat by a single biasing means.

5. A valve as claimed in claim 3 in which said rotatable valve may be so positioned as to close communication between the inlet passage and said air motor.

References Cited in the file of this patent

UNITED STATES PATENTS

| | | |
|---|---|---|
| 1,925,215 | Sturm | Sept. 5, 1933 |
| 2,696,975 | Massey et al. | Dec. 14, 1954 |
| 2,770,098 | Korkowski et al. | Nov. 13, 1956 |